US012618668B2

(12) United States Patent
Hu et al.

(10) Patent No.: US 12,618,668 B2
(45) Date of Patent: May 5, 2026

(54) METHOD FOR CALCULATING DIAMETER OF ANNULAR NON-FULL FORMWORK SUPPORT FOR CIRCULAR SHAFT

(71) Applicant: China RAILWAY No. 8 Engineering Group Co., Ltd., Chengdu (CN)

(72) Inventors: Jian Hu, Chengdu (CN); Fei Zhang, Chengdu (CN); Zilong Zhang, Chengdu (CN); Zhengwei Fu, Chengdu (CN); Sihong Zhu, Chengdu (CN); Quansheng Ran, Chengdu (CN); Zeyu Wang, Chengdu (CN); Malin Dong, Chengdu (CN); Yue Lin, Chengdu (CN); Xuejian Yang, Chengdu (CN)

(73) Assignee: China RAILWAY No. 8 Engineering Group Co., Ltd., Chengdu (CN)

( * ) Notice: Subject to any disclaimer, the term of this patent is extended or adjusted under 35 U.S.C. 154(b) by 410 days.

(21) Appl. No.: 18/533,206

(22) Filed: Dec. 8, 2023

(65) Prior Publication Data

US 2025/0155240 A1    May 15, 2025

(30) Foreign Application Priority Data

Nov. 14, 2023    (CN) .......................... 202311512309.4

(51) Int. Cl.
*G01B 21/10* (2006.01)
*E21D 5/04* (2006.01)
*E21D 5/12* (2006.01)

(52) U.S. Cl.
CPC ............... *G01B 21/10* (2013.01); *E21D 5/12* (2013.01); *E21D 5/04* (2013.01)

(58) Field of Classification Search
CPC .............. G01B 21/10; E21D 5/12; E21D 5/04
USPC ........................................................ 702/157
See application file for complete search history.

(56) References Cited

FOREIGN PATENT DOCUMENTS

CN        201611001276      * 11/2016    ......... E21D 21/0026

* cited by examiner

*Primary Examiner* — Francis Z. Santiago Merced

(57) ABSTRACT

The present invention relates to the technical field of tunnel shield construction, specifically to a method for calculating diameter of an annular non-full formwork support for a circular shaft. By calculating and designing an inner diameter of a formwork support, sufficient space left inside a shaft can be ensured, and the thickness of secondary lining can be ensured at the same time, thereby preventing from affecting the structural stability of the shaft.

5 Claims, 4 Drawing Sheets

13

METHOD FOR CALCULATING DIAMETER OF ANNULAR NON-FULL FORMWORK SUPPORT FOR CIRCULAR SHAFT

CROSS REFERENCE TO RELATED APPLICATIONS

The present application claims the benefit of Chinese Patent Application No. 202311512309.4 filed on Nov. 14, 2023, the contents of which are incorporated herein by reference in their entirety.

TECHNICAL FIELD

The present invention relates to the technical field of tunnel shield construction, specifically to a method for calculating diameter of an annular non-full formwork support for a circular shaft.

BACKGROUND

During tunnel shield construction, a shaft needs to be excavated so that a shield machine can enter to carry out construction work. A circular shaft is usually used. When the circular shaft is relatively deep, a formwork support is needed to carry out secondary lining concrete from bottom to top of the shaft. However, as subjected to the pressure of surrounding rock, the shaft will be constantly deformed, and it is difficult to determine the dimension of the inner diameter of the annular formwork support. Thus a method for calculating diameter of an annular non-full formwork support for a circular shaft is proposed.

SUMMARY

The purpose of the present invention is to provide a method for calculating diameter of an annular non-full formwork support for a circular shaft. By calculating and designing an inner diameter of a formwork support, sufficient space left inside a shaft can be ensured, and the thickness of secondary lining concrete can be ensured at the same time, thereby preventing from affecting the structural stability of the shaft.

The purpose of the present invention is to provide a method for calculating diameter of an annular non-full formwork support for a circular shaft. The annular non-full formwork support for a circular shaft includes a shaft, primary lining concrete, secondary lining concrete, and an annular formwork support, where the shaft is excavated in surrounding rock, the annular formwork support is fixedly mounted in the shaft, the primary lining concrete is poured on an inner wall of the shaft, the secondary lining concrete is poured between the annular formwork support and the primary lining concrete, a sliding surface is located in the surrounding rock, the primary lining concrete is uniformly distributed on the inner wall of the shaft, and the diameter of the annular formwork support is calculated by the following formula:

$$R = 2\left(a - d_{ral} - U\right), \qquad \text{(Formula 1)}$$

in Formula 1, R is the diameter of the annular formwork support,
U is a thickness of the secondary lining concrete,
a is a radius of the shaft, and $d_{ral}$ is a radial deformation of the primary lining concrete; the formula of the radial deformation $d_{ral}$ of the primary lining concrete is as follows:

$$\begin{cases} d_{ral} = \dfrac{1}{E}\left[N(a-t)(1-\mu) - (1+\mu)\dfrac{M}{a-t}\right] \\ M = \dfrac{(a-t)^2 a^2 q}{t(2a-t)},\ N = \dfrac{-a^2 q}{t(2a-t)} \end{cases}, \qquad \text{(Formula 2)}$$

in Formula 2, $d_{ral}$ is the radial deformation of the primary lining concrete,
t is a thickness of the primary lining concrete,
E is an elasticity modulus of the shaft,
$\mu$ is a Poisson's ratio of the shaft,
a is the radius of the shaft,
q is a surrounding rock pressure on the shaft wall,
M is an intermediate process quantity; and
N is an intermediate process quantity.

Optionally, after excavation of the shaft, rock and soil on the surrounding rock slide towards the shaft through the sliding surface, a distance from any point in the rock and soil in the sliding surface to the ground is s, and a formula for the pressure q of the surrounding rock on the shaft wall at any depth can be found as follows:

$$\begin{cases} q = \gamma a\left(\dfrac{b-a}{b}\right)^{\lambda-1}\dfrac{\tan\left(45° - \varphi/2\right)}{\lambda - 1} \\ b = a + (h_0 - s)\tan\left(45° - \varphi/2\right),\ \lambda = 2\tan\varphi\tan\left(45° + \varphi/2\right) \end{cases}, \qquad \text{(Formula 3)}$$

in Formula 3, $h_0$ is a depth of the shaft,
a is the radius of the shaft,
b is a length from a center of the shaft to the sliding surface,
$\gamma$ is a bulk density of the rock and soil,
$\varphi$ is an internal friction angle of the rock and soil, $$45° + \frac{\varphi}{2}$$

is an angle between the sliding surface and the horizontal plane that can be determined by the internal friction angle of the rock and soil, and
s is a distance from any point in the rock and soil to the ground.

Optionally, the annular formwork support is composed of support trusses, uprights and crossbars, and the annular formwork support is fixed to the inner wall of the shaft by means of anchors.

Optionally, a maximum value of the radial deformation of the primary lining concrete is taken for calculation.

Optionally, the support trusses are fixedly connected to the crossbars by means of bolts, and the crossbars are fixedly connected to the uprights by means of bolts.

The present invention provides a method for calculating diameter of an annular non-full formwork support for a circular shaft. The annular non-full formwork support for a circular shaft includes a shaft, primary lining concrete, secondary lining concrete, and an annular formwork support. The shaft is excavated in surrounding rock, the annular formwork support is fixedly mounted in the shaft, the primary lining concrete is poured on an inner wall of the shaft, the secondary lining concrete is poured between the annular formwork support and the primary lining concrete, a sliding surface is located in the surrounding rock, the primary lining concrete is uniformly distributed on the inner wall of the shaft, and the diameter of the annular formwork support is calculated by the following formula:

$$R = 2(a - d_{ral} - U). \tag{Formula 1}$$

By calculating and designing the diameter of a formwork support, sufficient space left inside a shaft can be ensured, and the thickness of secondary lining concrete can be ensured at the same time, thereby preventing from affecting the structural stability of the shaft.

In the Figures: 11, shaft; 12, surrounding rock; 13, annular formwork support; 14, primary lining concrete; 15, secondary lining concrete; and 16, sliding surface.

DETAILED DESCRIPTION

Figure 1:
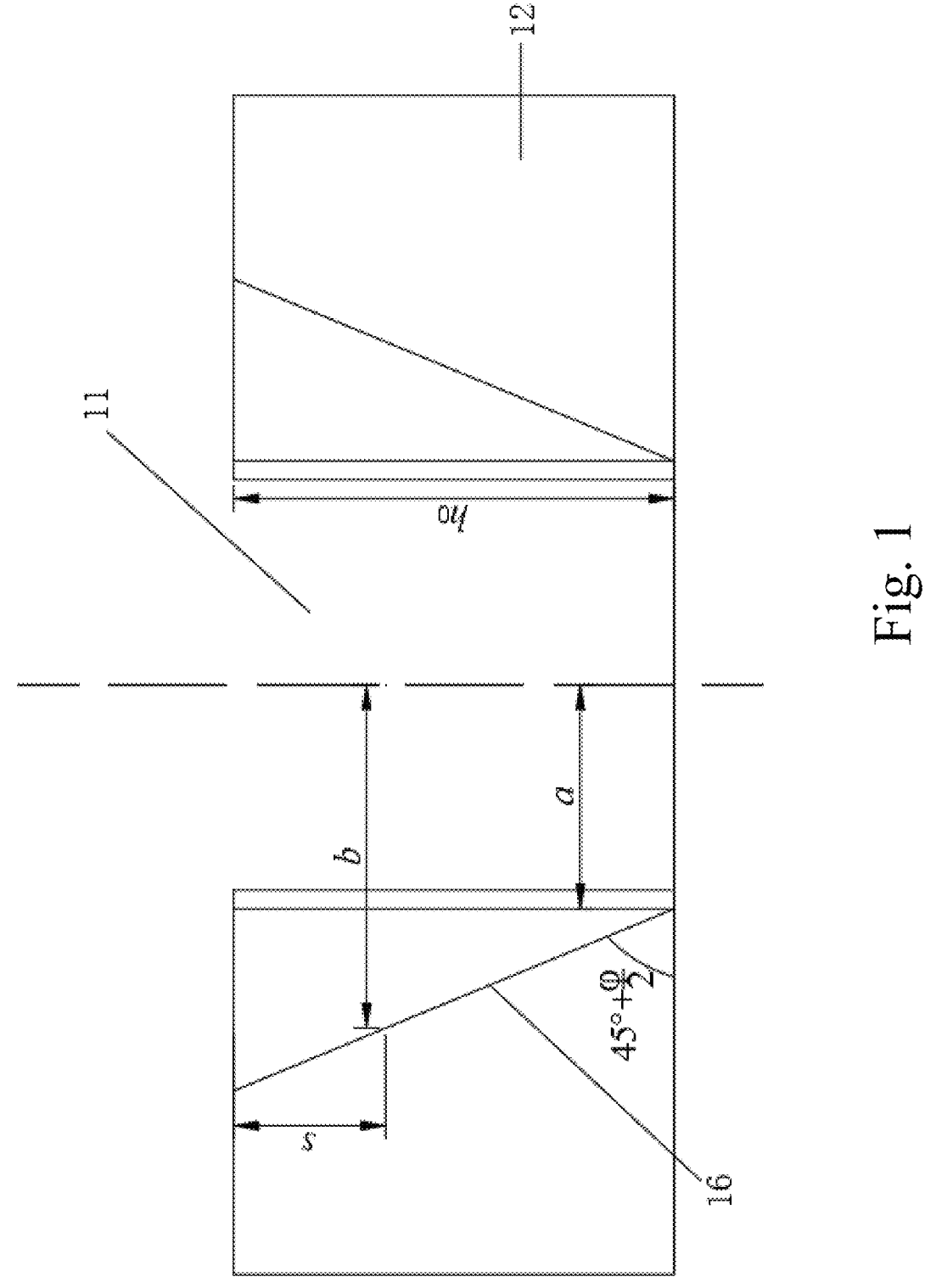
FIG. 1 is a schematic cross-section diagram of a method for calculating diameter of an annular non-full formwork support for a circular shaft provided in an embodiment of the present disclosure.
Figure 2:
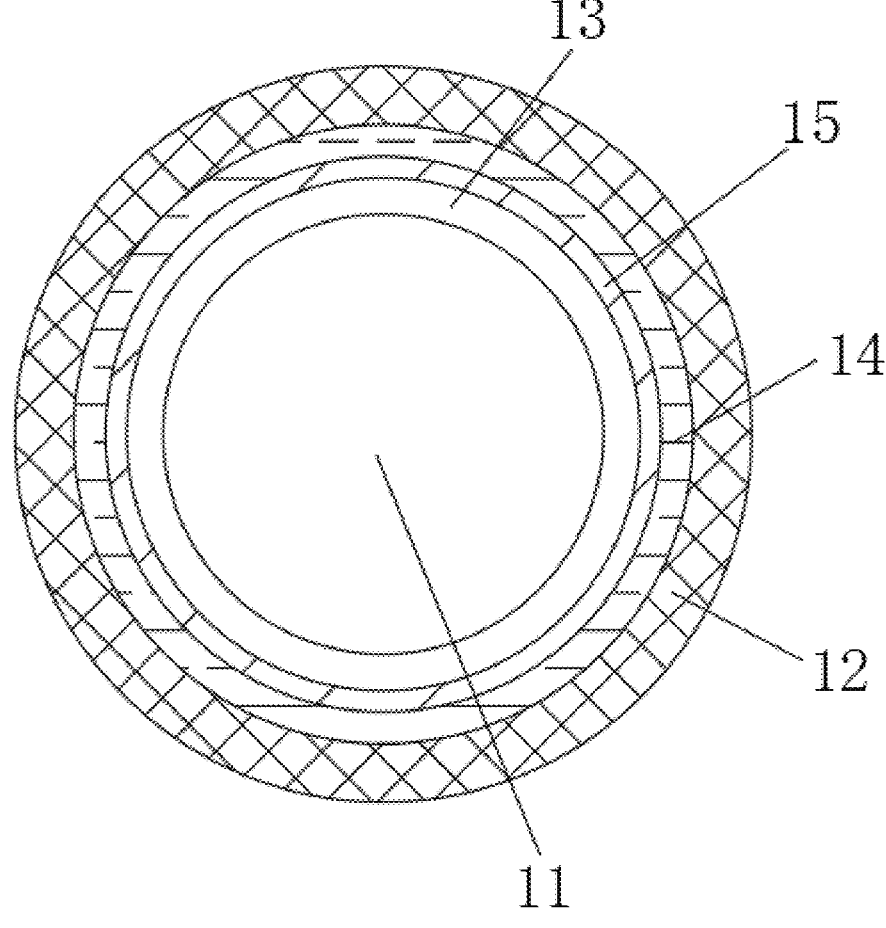
FIG. 2 is a top view schematic diagram of a method for calculating diameter of an annular non-full formwork support for a circular shaft provided in an embodiment of the present disclosure.
Figure 3:
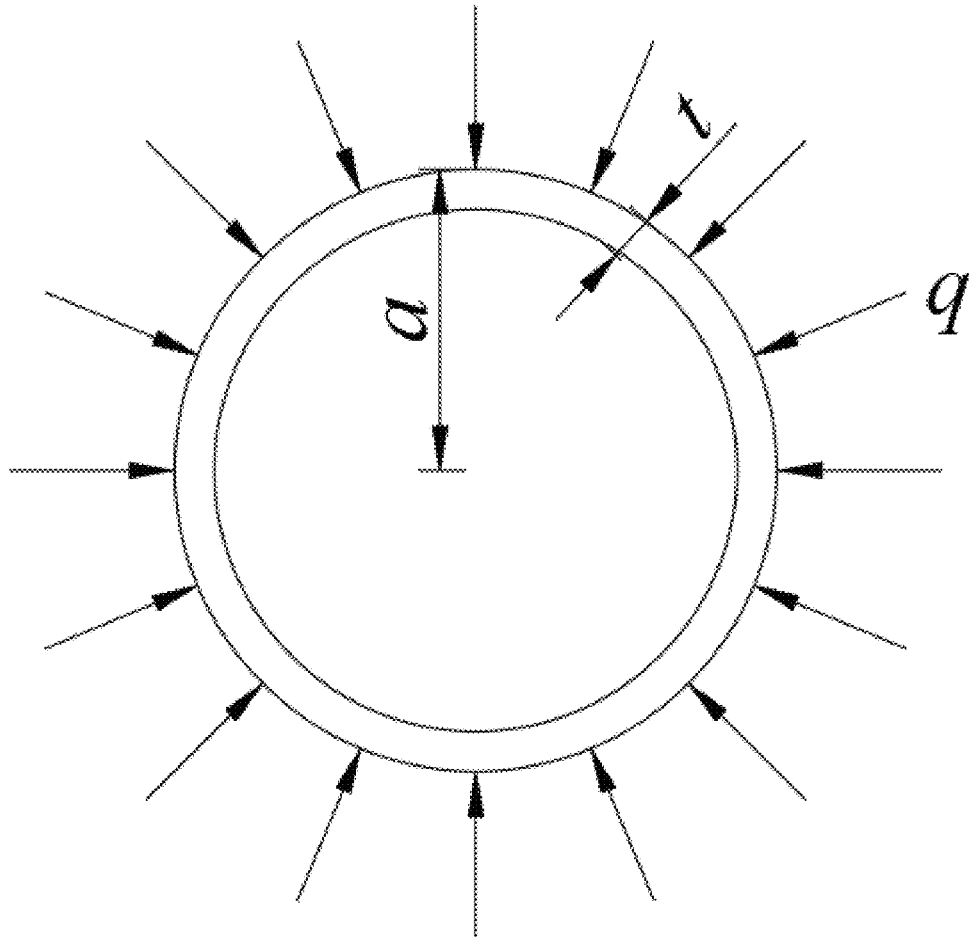
FIG. 3 is a schematic diagram of the force on the shaft of a method for calculating diameter of an annular non-full formwork support for a circular shaft provided in an embodiment of the present disclosure.
Figure 4:
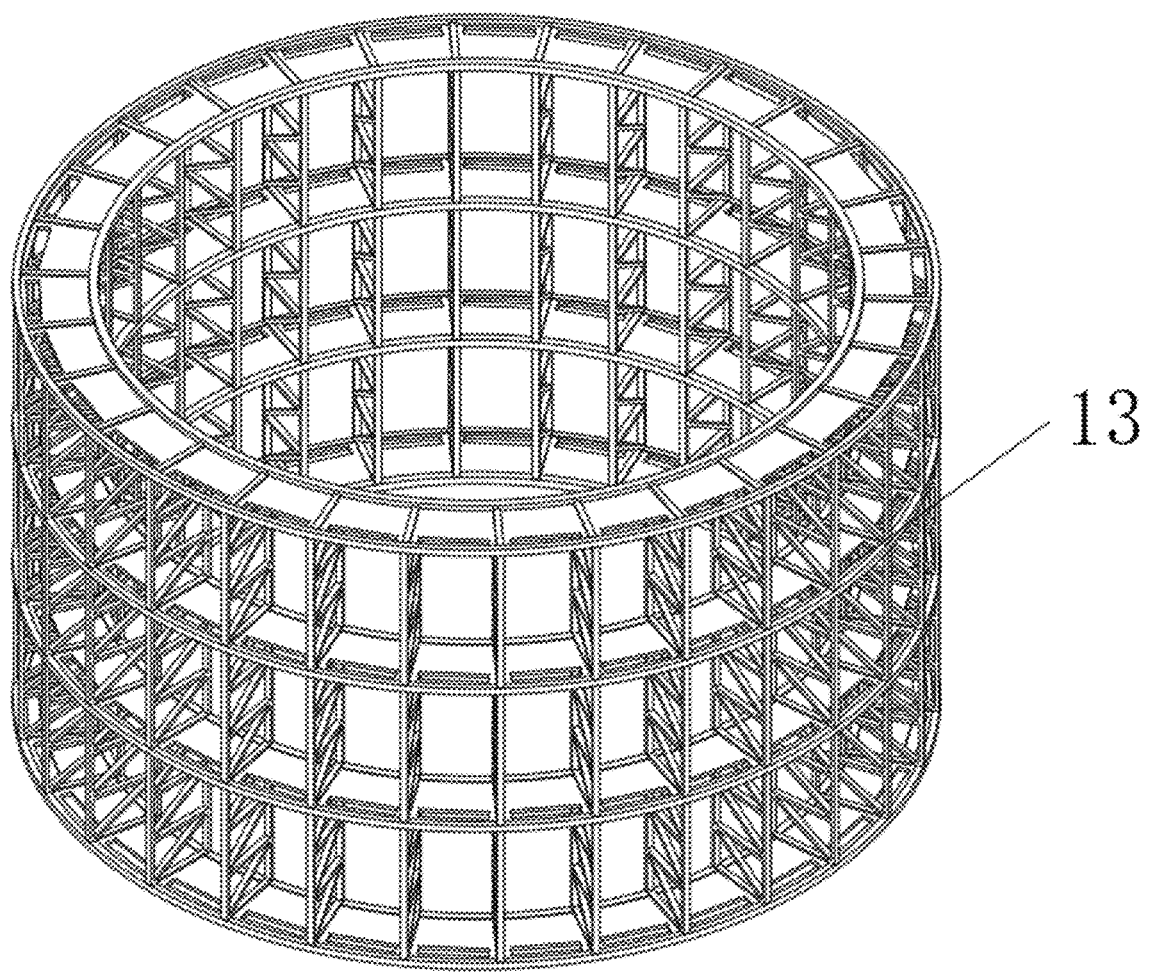
FIG. 4 is a front view three-dimensional schematic diagram of the annular formwork support structure of a method for calculating diameter of an annular non-full formwork support for a circular shaft provided in an embodiment of the present disclosure.

As shown in FIGS. 1-4, Embodiments of the present invention provide a method for calculating diameter of an annular non-full formwork support for a circular shaft. The annular non-full formwork support for a circular shaft includes a shaft 11, primary lining concrete 14, secondary lining concrete 15, and an annular formwork support 13. The shaft 11 is excavated in surrounding rock 12, the annular formwork support 13 is fixedly mounted in the shaft 11, the primary lining concrete 14 is poured on an inner wall of the shaft 11, the secondary lining concrete 15 is poured between the annular formwork support 13 and the primary lining concrete 14, a sliding surface 16 is located in the surrounding rock 12, the primary lining concrete 14 is uniformly distributed on the inner wall of the shaft 11, and the diameter of the annular formwork support 13 is calculated by the following formula:

$$R = 2(a - d_{ral} - U), \tag{Formula 1}$$

in Formula 1, R is the diameter of the annular formwork support,
U is a thickness of the secondary lining concrete,
a is a radius of the shaft, and
$d_{ral}$ is a radial deformation of the primary lining concrete;

in Formula 1, the radial deformation of the primary lining concrete 14 is found, and the optimal solution for the diameter of the annular formwork support mounted in the shaft 11 is obtained, so that sufficient space inside the shaft can be ensured, and the thickness of the secondary lining concrete can be ensured at the same time, thereby preventing from affecting the structural stability of the shaft.

the formula of the radial deformation $d_{ral}$ of the primary lining concrete is as follows:

$$\begin{cases} d_{ral} = \dfrac{1}{E}\left[N(a-t)(1-\mu) - (1+\mu)\dfrac{M}{a-t}\right] \\ M = \dfrac{(a-t)^2 a^2 q}{t(2a-t)}, \quad N = \dfrac{-a^2 q}{t(2a-t)} \end{cases}, \tag{Formula 2}$$

in Formula 2, $d_{ral}$ is the radial deformation of the primary lining concrete,
t is a thickness of the primary lining concrete,
E is an elasticity modulus of the shaft,
μ is a Poisson's ratio of the shaft,
a is the radius of the shaft,
q is a surrounding rock pressure on the shaft wall,
M is an intermediate process quantity; and
N is an intermediate process quantity.

After excavation of the shaft 11, rock and soil on the surrounding rock 12 slide towards the shaft 11 through the sliding surface 16, a distance from any point in the rock and soil in the sliding surface 16 to the ground is s, and a formula for the pressure q of the shaft 12 on the shaft wall at any depth can be found as follows:

$$\begin{cases} q = \gamma a\left(\dfrac{b-a}{b}\right)^{\lambda-1}\dfrac{\tan(45° - \varphi/2)}{\lambda - 1} \\ b = a + (h_0 - s)\tan(45° - \varphi/2), \quad \lambda = 2\tan\varphi\tan(45° + \varphi/2) \end{cases}, \tag{Formula 3}$$

in Formula 3, $h_0$ is a depth of the shaft,
a is the radius of the shaft,
b is a length from a center of the shaft to the sliding surface,
γ is a bulk density of the rock and soil,
φ is an internal friction angle of the rock and soil, $$45° + \dfrac{\varphi}{2}$$

is an angle between the sliding surface and the horizontal plane that can be determined by the internal friction angle of the rock and soil, and s is a distance from any point in the rock and soil to the ground.

The pressure change in the shaft 12 can be used to calculate the radial deformation $d_{ral}$ of the primary lining concrete 14, which facilitates finding the diameter of the annular formwork support.

The annular formwork support 13 is composed of support trusses, uprights and crossbars, the annular formwork support 13 is fixed to the inner wall of the shaft 11 by means of anchors, and an outer ring of the annular formwork support 13 and an inner ring of the primary lining concrete 14 are used for the second lining concrete 15 to pour, thereby stabilizing the internal structure of the shaft 11.

A maximum value of the radial deformation of the primary lining concrete is taken for calculation. As an engineering structure, the stability and safety of the shaft 11 are crucial. Calculating the diameter of the annular non-full formwork support can ensure sufficient thickness and strength left for the secondary lining and reduce the accumulation of deformation in the shaft 11, thereby extending the service life of the shaft 11, and at the same time can ensure sufficient space left in the shaft to facilitate the shield equipment to enter the shaft 11.

The support trusses are fixedly connected to the crossbars by means of bolts, and the crossbars are fixedly connected to the uprights by means of bolts. A plurality of sets of support trusses, uprights and crossbars are spliced to each other to form the annular formwork support 13, and the inner diameter of the annular formwork support 13 is determined by the support trusses, uprights and crossbars.

Working principle: after the excavation of the shaft 11, surrounding rock and soil slide into the shaft, and the pressure q of the surrounding rock on the shaft wall at any depth is found with the calculating formula as follows:

$$\begin{cases} q = \gamma a \left(\dfrac{b-a}{b}\right)^{\lambda-1} \dfrac{\tan(45°-\varphi/2)}{\lambda-1} \\ b = a + (h_0 - s)\tan(45°-\varphi/2), \lambda = 2\tan\varphi\tan(45°+\varphi/2) \end{cases} \quad \text{(Formula 3)}$$

After the pressure q of the surrounding rock 12 on the shaft wall is found, the radial deformation $d_{ral}$ of the shaft is found with the formula as follows:

$$\begin{cases} d_{ral} = \dfrac{1}{E}\left[N(a-t)(1-\mu) - (1+\mu)\dfrac{M}{a-t}\right] \\ M = \dfrac{(a-t)^2 a^2 q}{t(2a-t)}, N = \dfrac{-a^2 q}{t(2a-t)} \end{cases} \quad \text{(Formula 2)}$$

It can determine there-from the magnitude of the radial deformation of the primary lining of the shaft at any depth from the ground. In engineering design and construction, the thickness of the primary lining concrete 14 of the shaft is generally uniform. To ensure safety, a maximum value of the radial deformation of the primary lining concrete is taken for calculation. As the greater the pressure of the surrounding rock 12, the greater the deformation, it is only necessary to calculate the maximum pressure $q_{max}$ of the surrounding rock by (Formula 3), then substitute the maximum pressure into (Formula 2) to find the radial deformation $d_{ral}$ of the primary lining of the shaft, and find the diameter calculating formula of the annular formwork support 13 by means of (Formula 2) the radial deformation $d_{ral}$ of the primary lining of the shaft:

$$R = 2(a - d_{ral} - U). \quad \text{(Formula 1)}$$

The inner diameter of the annular formwork support 13 is thus found. By calculating and designing the inner diameter of the formwork support 13, sufficient space left inside the shaft 11 can be ensured, and the thickness of the secondary lining concrete 15 can be ensured at the same time, thereby preventing from affecting the structural stability of the shaft 11.

What is claimed is:

1. A method for calculating diameter of an annular non-full formwork support for a circular shaft, characterized in that the annular non-full formwork support for a circular shaft comprises a shaft, primary lining concrete, secondary lining concrete, and an annular formwork support, wherein the shaft is excavated in surrounding rock, the annular formwork support is fixedly mounted in the shaft, the primary lining concrete is poured on an inner wall of the shaft, the secondary lining concrete is poured between the annular formwork support and the primary lining concrete, a sliding surface is located in the surrounding rock, the primary lining concrete is uniformly distributed on the inner wall of the shaft, and the diameter of the annular formwork support is calculated by the following formula:

$$R = 2(a - d_{ral} - U), \quad \text{(Formula 1)}$$

in Formula 1, R is the diameter of the annular formwork support,
U is a thickness of the secondary lining concrete,
a is a radius of the shaft, and
$d_{ral}$ is a radial deformation of the primary lining concrete;
a formula for the radial deformation $d_{ral}$ of the primary lining concrete is as follows:

$$\begin{cases} d_{ral} = \dfrac{1}{E}\left[N(a-t)(1-\mu) - (1+\mu)\dfrac{M}{a-t}\right] \\ M = \dfrac{(a-t)^2 a^2 q}{t(2a-t)}, N = \dfrac{-a^2 q}{t(2a-t)} \end{cases} \quad \text{(Formula 2)}$$

in Formula 2, $d_{ral}$ is the radial deformation of the primary lining concrete,
t is a thickness of the primary lining concrete,
E is an elasticity modulus of the shaft,
μ is a Poisson's ratio of the shaft,
a is the radius of the shaft,
q is a surrounding rock pressure on the shaft wall,
M is an intermediate process quantity; and
N is an intermediate process quantity.

2. A method for calculating diameter of an annular non-full formwork support for a circular shaft according to claim 1, characterized in that after excavation of the shaft, rock and soil on the surrounding rock slide towards the shaft through the sliding surface, a distance from any point in the rock and soil in the sliding surface to the ground is s, and a formula for the pressure q of the surrounding rock on the shaft wall at any depth can be found as follows:

$$\begin{cases} q = \gamma a \left(\dfrac{b-a}{b}\right)^{\lambda-1} \dfrac{\tan(45°-\varphi/2)}{\lambda-1} \\ b = a + (h_0 - s)\tan(45°-\varphi/2), \lambda = 2\tan\varphi\tan(45°+\varphi/2) \end{cases} \quad \text{(Formula 3)}$$

in Formula 3, $h_0$ is a depth of the shaft,
a is the radius of the shaft,
b is a length from a center of the shaft to the sliding surface,
γ is a bulk density of the rock and soil,
φ is an internal friction angle of the rock and soil, $$45° + \frac{\varphi}{2}$$

is an angle between the sliding surface and a horizontal plane that can be determined by the internal friction angle of the rock and soil, and s is a distance from any point in the rock and soil to the ground.

3. A method for calculating diameter of an annular non-full formwork support for a circular shaft according to claim 1, characterized in that the annular formwork support is composed of support trusses, uprights and crossbars, and the annular formwork support is fixed to the inner wall of the shaft by means of anchors.

4. A method for calculating diameter of an annular non-full formwork support for a circular shaft according to claim 1, characterized in that a maximum value of the radial deformation of the primary lining concrete is taken for calculation.

5. A method for calculating diameter of an annular non-full formwork support for a circular shaft according to claim 3, characterized in that the support trusses are fixedly connected to the crossbars by means of bolts, and the crossbars are fixedly connected to the uprights by means of bolts.

\* \* \* \* \*